March 25, 1924.  
J. S. DELANEY  
SCARFING MACHINE  
Filed Jan. 9, 1923  
1,487,841
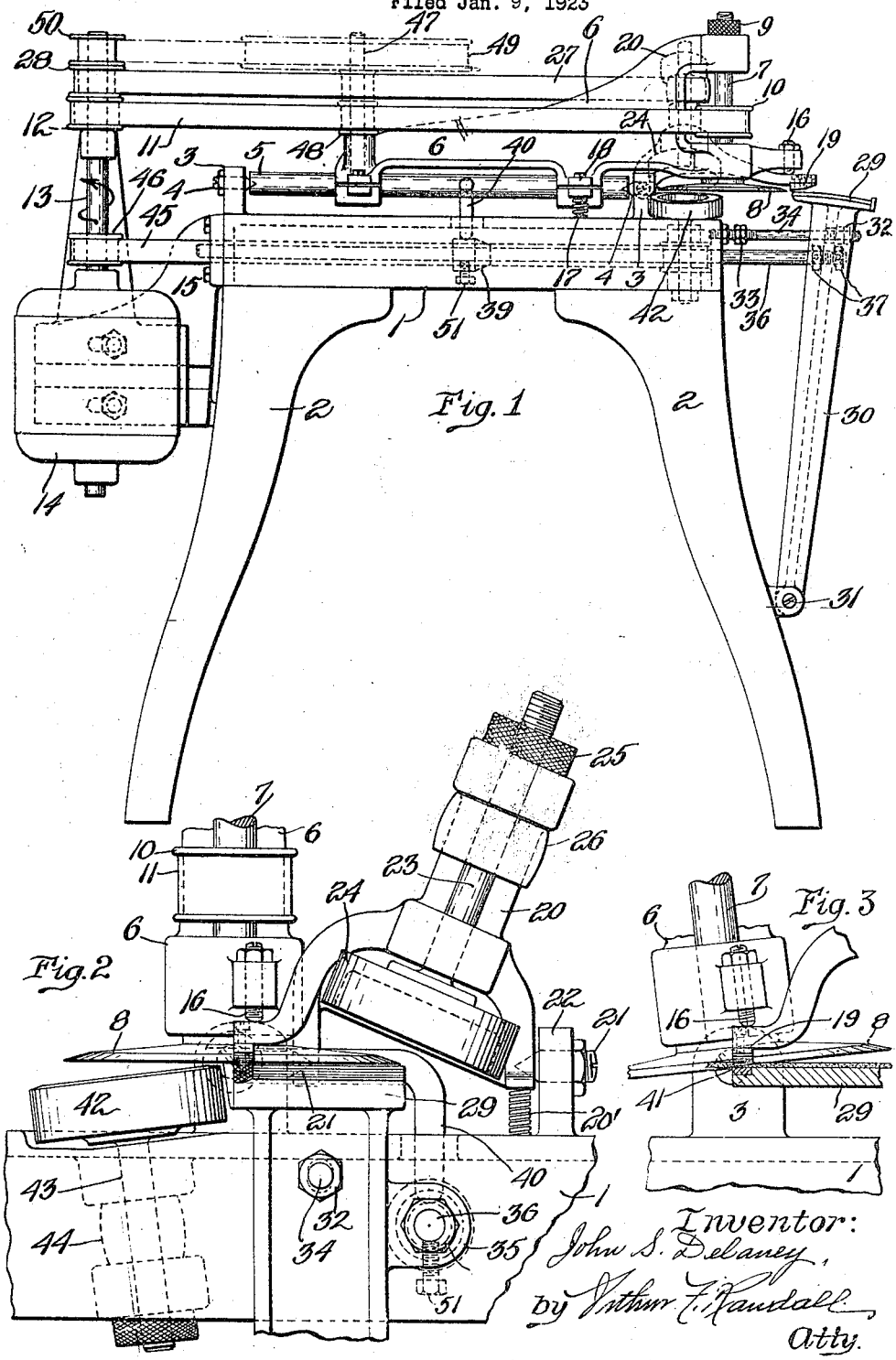

Patented Mar. 25, 1924.

1,487,841

UNITED STATES PATENT OFFICE.

JOHN S. DELANEY, OF SAUGUS, MASSACHUSETTS.

SCARFING MACHINE.

Application filed January 9, 1923. Serial No. 611,676.

*To all whom it may concern:*

Be it known that I, JOHN S. DELANEY, a citizen of the United States, and resident of Saugus, in the county of Essex and State of Massachusetts, have invented certain new and useful Improvements in Scarfing Machines, of which the following is a specification.

My invention relates to machines for scarfing the ends of leather strips and the like.

In the manufacture of boots and shoes it is customary to line the interior of the upper, near the top edge thereof, with a thin narrow facing strip of leather and this facing material is supplied to shoe makers in the form of a very long strip wound into a roll. This long strip of thin facing leather is produced by joining together the ends of a number of smaller strips, the joined ends of which are oppositely scarfed or beveled, overlapped and cemented together. My invention has for its object to provide an improved machine for scarfing the ends of the leather strips preparatory to cementing or otherwise fastening them together to form a long strip of the kind referred to.

An important feature of my improved scarfing machine consists in constructing the same with a pivotally supported work rest made at one end with an arcuate cutting edge co-operating with a rotatable cutter or knife, said work rest being movable on its pivotal support to carry the work to and from the rotating cutter. After the leather strip is placed upon the work rest the latter is swung toward the cutter and the latter, occupying an angular position with relation to the work rest and strip, cuts its way through and across the strip leaving the same with a scarfed or beveled edge.

Obviously, with a given angular relationship between the plane of the circular cutting edge of the rotary cutter and the work rest, the width of the beveled face produced at the end of the strip by the cutter, would vary with strips of different thicknesses, so it is desirable that this angular relationship may be variable in order to adapt the machine to operate upon stock of different thicknesses. Therefore, as another feature of my invention, the rotary cutter is made adjustable so that this angular relationship may be varied as necessary. This is best accomplished by mounting the rotary cutter upon a support that is pivotally adjustable upon an axis co-incident and parallel with the plane of the cutting edge of the rotary cutter and also co-incident and parallel with the plane of the arcuate cutting edge of the work rest. This construction permits of angular adjustment of the cutter relatively to the work rest to accord with the thickness of stock being operated upon. In the best form of my invention I provide, as another feature thereof, means for automatically adjusting the cutter angularly relatively to the work rest according to the thickness of stock being operated upon.

Other features of my invention are hereinafter pointed out.

In the accompanying drawings:

Figure 1 is a side elevation of a scarfing machine constructed in accordance with my invention;

Figure 2 is a front elevation, upon larger scale, of a portion of the machine shown in Figure 1;

Figure 3 is a detail partly in section.

In the accompanying drawings, 1 is the bed of my improved scarfing machine, said bed being herein shown as supported from the floor by legs 2. Upon the top side of bed 1 is provided a pair of lugs 3, 3 carrying pivot screws 4, 4 by which a horizontal rock shaft 5 is supported. To this rock shaft is clamped a cutter supporting frame 6 provided at its front end with a pair of vertical alined bearings within which is journaled a spindle 7 having a rotary disk cutter 8 fast on its lower end. The spindle 7 is supported within its bearings with provision for vertical adjustment by a nut 9 applied to the threaded upper end of said spindle. Intermediate its ends spindle 7 has fast thereon a pulley 10 connected by a belt 11 with a pulley 12 fast on the vertically disposed armature shaft 13 of an electric motor 14. Motor 14 is carried by a bracket 15 projecting from bed 1.

At its front end frame 6 carries a screw 16 that is yieldingly held, at times, by a spring 17 against the top of the presser foot 19 herein shown as an arm integral with, and projecting forwardly from, a frame 20 said spring 17 being interposed between an arm 18 projecting from frame 6 and the bed 1. The frame 20 is pivotally supported by pivot screws 21 one of which is mounted in the forward lug 3 and the other in an adjacent upstanding lug 22 integral with bed 1. The frame 20 is made with bearings in which is journaled a spindle 23 having an emery wheel or the like 24 fast on its lower end. Spindle 23 is supported within its bearings with provision for vertical adjustment by a nut 25 applied to its upper threaded end. On spindle 23 there is fastened a pulley 26 connected by a belt 27 with a pulley 28 fast on armature shaft 13. The tension and weight of belt 27 acts to yieldingly support the presser foot 19 and hold it against screw 16 but with less effect than the downward thrust of the screw 16 occasioned by spring 17.

The presser foot 19 is disposed immediately above a work rest or table 29 provided at the upper end of an arm 30 that is pivotally mounted at 31 upon one of the legs 2 so as to swing toward and from the rotary cutter 8. Nuts 32 and 33 mounted upon a stud 34 projecting from the front of bed 1 serve as stops to limit the movement of arm 30 in both directions, the portion of said stud between the nuts extending loosely through a hole provided in said arm as indicated in Figures 1 and 2.

At one side thereof the arm 30 is made with a laterally projecting lug 35 formed with an aperture through it into which a rod 36 is loosely fitted, said rod carrying nuts 37 and 38 at opposite sides of said lug so that when the arm 30 is swung on its pivot 31 in either direction the rod 36 is moved endwise. Rod 36 is mounted in bearing provided on bed 1 and within the latter has adjustably mounted thereon a cam 39 co-operating with an arm 40 projecting from the cutter support 6. This cam is constructed and arranged so as to occupy a position under arm 40 when work rest 30 occupies its retracted position shown in Figure 1, and so that when the work rest is swung toward the cutter 8 said cam is moved from beneath arm 40 thereby permitting spring 17 to swing support 6 on its pivots 4 toward the right (in Figs. 2 and 3) thus causing the screw 16 to push the presser foot down onto the work as shown in Fig. 3. The parts are so constructed and arranged that if the work rest is thus swung toward the cutter 8 without a piece of stock resting upon the top thereof, then the presser foot will come to rest upon the top surface of the work rest at which time the cutter will occupy a horizontal position as shown in Fig. 2, with the top of the work rest immediately below the plane of the circular cutting edge of the cutter. It will therefore be clear that if a strip of leather stock is upon the top of the work rest when the latter is swung toward the cutter, then the descent of the presser foot will be arrested short of the extreme limit of its downward movement a distance equal to the thickness of the stock leaving the cutter canted at an angle relatively to the work rest as shown in Fig. 3, and it will also be clear that this angle will vary directly as the thickness of the leather strips vary. In this way the angle of the cutter relatively to the work rest is automatically adjusted to accord with the thickness of the stock being operated upon and so as to reduce this angle when the stock is relatively thin and increase it when relatively thick. Thus, regardless of the thickness of the stock, the machine operates at all times to produce a beveled end of sufficient length or size when operating upon thin stock and not of unnecessary large size, when operating upon thick stock. The machine herein shown is designed to produce beveled or scarfed ends of approximately one and the same length upon strips varying in thickness from one-thirty-second of an inch to one-sixteenth.

As shown in Figs. 2 and 3, the axis of shaft 5 is parallel and in alinement with the plane of the circular cutting edge of the rotary cutter 8 and its axis extended forwardly passes through the center of said cutter. Also it will be observed from Figs. 2 and 3 that the work rest 29 has one end thereof parallel and alined with the axis of rock shaft 5 and the center of cutter 8, the top of this work rest being of arcuate form concentric with the pivot 31 and substantially touching a horizontal plane passing through the axis of shaft 5. With the parts constructed and arranged as described the corner 41 of the work rest serves as an arcuate cutting edge co-operating with the cutter 8 at all times, whatever be the angular relationship between the cutter 8 and the work rest.

In operating my improved machine the cam 39 is positioned according to the width of stock being operated upon so that after the leather strip has been placed upon the work rest 29 with one side thereof resting against an upstanding gauge or abutment flange 52 provided at the front side of the work rest, and the latter is swung inwardly toward the cutter 8, the arm 40 will ride off from the cam 39 just as the rear side of the leather strip is brought into position under the presser foot 19. It follows, therefore, that engagement of the presser foot with the rear side edge of the leather strip which would tend to buckle and displace the leather strip, particularly if it be a thin one, is avoided. Thus the presser foot is lowered onto the top of the work close to its rear side edge just before the work reaches the cutter 8. Thereafter, continued inward movement of the work rest causes the rotary cutter, held at the proper angle by the engagement of the presser foot with the work, to cut its way through the latter.

In order to provide for adjustment of cam 39 on rod 36, a set screw 51 is provided by means of which the cam is fixed in any desired position on said rod.

Beneath the rotary cutter 8 is arranged an emery wheel 42, or the like, that is fast on the upper end of a spindle 43 journaled in bearings on bed 1. This spindle carries a pulley 44 connected by a belt 45 with a pulley 46 fast on armature shaft 13. Journaled in bearings on cutter frame 6 is an upright shaft 47 carrying two pulleys 48 and 49, the former occupying co-operative position with the pulley 10 on spindle 7 and being smaller than said pulley 10, and the latter being relatively large and occupying co-operative position with relation to a smaller pulley 50 fast on the upper end of armature shaft 13. When it is desired to sharpen the rotary cutter 8 the work rest 29 is swung inwardly thereby causing the cutter 8 to be placed in a horizontal position as shown in Fig. 2. Then, after substituting a short belt connecting pulleys 48 and 10 for belt 11, and connecting the pulleys 49 and 50 by a supplemental belt, that is furnished with the machine, as indicated by dotted lines in Fig. 1, the nuts 9 and 25 are manipulated to lower the cutter 8 into contact with the emery wheel 42 and the emery wheel 24 into contact with the beveled edge of the cutter. As will be clear, the cutter 8 will be driven at greatly reduced speed during the grinding operation, and the emery wheels at relatively high speed.

What I claim is:

1. In a machine of the character described, the combination of a rotatable cutter and a pivotally supported work rest made at one end with an arcuate cutting edge co-operating with said cutter, said work rest being movable on its pivotal support to carry the work toward and from the cutter.

2. In a machine of the character described, the combination of a rotatable cutter and a pivotally supported work rest made at one end with an arcuate cutting edge co-operating with said cutter, said work rest being movable on its pivotal support to carry the work toward and from the cutter and said cutter occupying an angular position with relation to the work rest when in engagement with the work carried by the latter.

3. In a machine of the character described, the combination of a rotatable and angularly adjustable cutter; a pivotally supported work rest made at one end with an arcuate cutting edge co-operating with said cutter, said work rest being movable on its pivotal support to carry the work toward and from the cutter, and a presser foot for holding the work in position upon the work rest and controlling the angular position of the cutter with relation to the work rest according to the thickness of the work.

4. In a machine of the character described, the combination of a rotatable cutter; a work rest movable toward and from said cutter; a presser foot for holding the work in position upon the work rest during the cutting operation, and means through which the presser foot is controlled by the work rest.

5. In a machine of the character described, the combination of a rotatable cutter; a work rest movable toward and from said cutter; a presser foot for holding the work in position upon the work rest during the cutting operation, and means through which the presser foot is controlled by said work rest so as to engage only the top side of the work upon said rest.

6. In a machine of the character described, the combination of a rotatable and angularly adjustable cutter; a pivotally supported work rest made at one end with a cutting edge co-operating with said cutter, said work rest being movable on its pivotal support to carry the work toward and from the cutter; a presser foot for holding the work in position upon the work rest and controlling the angular position of the cutter with relation to the work rest according to the thickness of the work, and means through which movement of the work rest toward and from the cutter raises and lowers the presser foot so that the latter engages only the top side of the work.

7. In a machine of the character described, the combination of a rotatable and angularly adjustable cutter; a work rest made at one end with a cutting edge co-operating with said cutter, said work rest being movable toward and from said cutter, and means to vary the angular position of the cutter relatively to the work rest in accordance with the thickness of the stock being operated upon.

8. In a machine of the character described, the combination of a rotatable and angularly adjustable cutter; a work rest made at one end with a cutting edge co-operating with said cutter, said work rest being movable toward and from said cutter, and automatic means for varying the angular position of the cutter relatively to the work rest according to the thickness of the stock being operated upon.

9. In a machine of the character described, the combination of a rotatable and angularly adjustable cutter, and a work rest made at one end with a cutting edge co-operating with said cutter, said cutter being pivotally adjustable about an axis coincident and parallel with the plane of the cutting edge on the work rest.

10. In a machine of the character described, the combination of a rotatable and angularly adjustable cutter, and a work rest made at one end with a cutting edge co-operating with said cutter, said cutter being pivotally adjustable about an axis coincident and parallel both with the vertical plane of said cutting edge and with the plane of the cutting edge of said cutter.

11. In a machine of the character described, the combination of a pivotally supported rotary cutter; a work rest made at one end with a cutting edge co-operating with said cutter, said work rest being movable toward and from the cutter; a presser foot engaging the work adjacent said cutting edge to hold the same against the work rest, and means through which the presser foot acts to angularly position the cutter relatively to the work rest according to the thickness of the stock being operated upon.

12. In a machine of the character described, the combination of a rotatable and angularly adjustable cutter; a work rest movable toward and from said cutter, and means to provide for varying the angular position of the cutter relatively to the work rest according to the thickness of the stock being operated upon.

In testimony whereof I have affixed my signature.

JOHN S. DELANEY.